United States Patent
Lloyd

(10) Patent No.: US 8,000,051 B2
(45) Date of Patent: Aug. 16, 2011

(54) METHOD FOR RECOVERING A POSITION AND CLOCK PERIOD FROM AN INPUT DIGITAL SIGNAL

(75) Inventor: Alan Lloyd, Bristol (GB)

(73) Assignee: STMicroelectronics (Research & Development) Limited, Bucks (GB)

( * ) Notice: Subject to any disclaimer, the term of this patent is extended or adjusted under 35 U.S.C. 154(b) by 28 days.

(21) Appl. No.: 12/580,535

(22) Filed: Oct. 16, 2009

(65) Prior Publication Data

US 2010/0037084 A1      Feb. 11, 2010

Related U.S. Application Data

(63) Continuation of application No. 11/753,286, filed on May 24, 2007, now Pat. No. 7,660,061.

(30) Foreign Application Priority Data

May 25, 2006   (EP) .................................... 06252736

(51) Int. Cl.
*G11B 5/09* (2006.01)

(52) U.S. Cl. ......................................................... 360/51

(58) Field of Classification Search .................... 360/51, 360/39, 42, 26, 65; 369/59; 375/342, 360, 375/355, 372, 375; 714/731; 370/503
See application file for complete search history.

(56) References Cited

U.S. PATENT DOCUMENTS

| | | | |
|---|---|---|---|
| 3,030,614 A | 4/1962 | Lehan et al. | |
| 3,377,625 A | 4/1968 | Filipowsky | |
| 3,903,504 A | 9/1975 | Rogers et al. | |
| 3,980,825 A | 9/1976 | Morrien | |
| 4,356,518 A * | 10/1982 | Lemoine et al. | 360/51 |
| 4,449,119 A | 5/1984 | Hanna et al. | |
| 4,796,280 A * | 1/1989 | Nesin et al. | 375/360 |
| 5,047,930 A | 9/1991 | Martens et al. | |
| 5,056,118 A * | 10/1991 | Sun | 375/342 |
| 5,299,118 A | 3/1994 | Martens et al. | |
| 5,327,302 A | 7/1994 | Khoury et al. | |
| 5,585,975 A | 12/1996 | Bliss | |
| 5,666,341 A | 9/1997 | Horibe et al. | |
| 5,793,824 A * | 8/1998 | Burch et al. | 375/372 |
| 6,191,717 B1 * | 2/2001 | Scott et al. | 341/143 |
| 7,088,976 B2 * | 8/2006 | Gregorius et al. | 455/260 |
| 7,423,827 B2 | 9/2008 | Neville et al. | |
| 7,519,138 B2 * | 4/2009 | Lee et al. | 375/355 |

(Continued)

OTHER PUBLICATIONS

European Search Report; European Application No. EP06252736.1; Oct. 6, 2006; 4 pages.

*Primary Examiner* — Fred Tzeng
(74) *Attorney, Agent, or Firm* — William J. Kubida; Peter J. Meza; Hogan Lovells US LLP

(57) ABSTRACT

A method for recovering a position and clock period from an input bi-phase encoded digital signal such as an SPDIF signal counts the intervals between phase changes of the input digital signal to derive the longest interval between the phase changes. The longest interval indicates the position and period length of a preamble portion of sub-frames of the signal and is stored, and a signal indicating the position of the longest interval between phase changes and an indication of the clock period of the input digital signal is provided.

20 Claims, 3 Drawing Sheets

U.S. PATENT DOCUMENTS

| | | |
|---|---|---|
| 2002/0105386 A1* | 8/2002 | Shastri .................... 331/11 |
| 2003/0223409 A1 | 12/2003 | Wiebe |
| 2004/0114632 A1* | 6/2004 | Yuuki et al. ............... 370/503 |
| 2005/0149801 A1* | 7/2005 | Oshima .................... 714/731 |
| 2005/0249323 A1 | 11/2005 | Konz |
| 2005/0265504 A1* | 12/2005 | Robinson et al. .......... 375/375 |
| 2007/0001722 A1* | 1/2007 | Young et al. ............. 327/156 |
| 2009/0056394 A1* | 3/2009 | Tsunoda .................... 70/209 |
| 2009/0189648 A1* | 7/2009 | Hochleitner et al. ........ 327/98 |

* cited by examiner

METHOD FOR RECOVERING A POSITION AND CLOCK PERIOD FROM AN INPUT DIGITAL SIGNAL

RELATED APPLICATIONS

The present application is a continuation of U.S. patent application Ser. No. 11/753,286 filed May 24, 2007, and entitled Integrated Circuit Interface with Locking Signal, which application claims priority of European Patent Application 06252736.1 filed May 25, 2006, both of which applications are incorporated herein in their entireties by this reference.

FIELD OF THE INVENTION

The present invention relates to a semiconductor integrated circuit providing an interface to receive and lock to an incoming digital data signal. The invention is particularly applicable to an interface of the type which may handle digital data having a wide frequency range, as occurs in consumer electronics device interfaces such as for DVD players/recorders.

BACKGROUND OF THE INVENTION

In electronics devices, particularly consumer electronics audio/video players and recorders, there is a need to exchange digital data between devices. This is so that audio or video data can be exchanged for processing. For example, an audio amplifier typically has a digital input to receive an output from a DVD player. To provide such an interface various standards are known, one such being the known Sony Philips Digital InterFace format (SPDIF).

The SPDIF format is used for digital exchange of audio data between devices. The format is well known and is briefly described later for completeness. In brief, the format comprises a structure of 32 bit sub-frames with two such sub-frames (left and right audio) comprising a frame of data. The frequency of data can vary over a wide range (16 kHz-192 kHz), the higher the frequency, the better the quality of the audio signal. The signal is bi-phase encoded so that the clock signal and data signal are encoded on a single line.

There is a need to recover the clock signal from the data signal. There is also a need to identify the start of each data frame and sub-frame. We have appreciated that the characteristics of a data signal of differing possible frequencies can be used to determine and lock on the start of data frames and determine the unit interval on frequency of the signal. The invention is defined in the claims to which reference is now directed.

The invention makes use of the appreciation that the preamble section (a header) of a digital data frame or sub-frame can include certain characteristic markers by which the start of a sub-frame or frame can be determined, as well as the frequency of the signal. In the embodiment, the particular characteristic is the fact that the preamble of a sub-frame includes a pulse (in the sense of the time between the successive signal edges) that is longer than any such pulse in the data signal. This allows the position of the preamble and the frequency of the clock signal to be quickly determined.

The preferred embodiment of the invention relates to the SPDIF format of digital audio signal. In this format the preamble includes a portion which violates the normal bi-phase coding rules and, in consequence, has a gap between the successive edges that is 6 unit intervals (UI) in contrast to the longest gap of 4 unit intervals (UI) in the data portion of the data stream. The embodiment therefore includes a longest pulse detector that determines whenever there is a longer gap between edges than preceding bits. At this point, the output of the longest pulse detector is asserted, indicating to a signal decoder the position of the frames and sub-frames and the clock frequency.

The invention allows very fast locking of the position a and frequency of a binary phase encoded signal with a characteristic preamble or header. The embodiment counts for a period long enough that at least one sub-frame header would be seen (in the case of SPDIF this is 128 bits). The longest pulse received in that time is known to be a specific position in the preamble that is 6 UI. By counting every third period the clock period of 2 UI can be rapidly recovered.

The invention may apply to formats other than SPDIF, but is particularly applicable to digital signals having a given format, but wide possible range of signal frequency.

SUMMARY OF THE INVENTION

A method for recovering a position and clock period from an input digital signal of the type having a marker period between phase changes that is longer than other periods between phase changes in the digital signal includes counting the intervals between phase changes of the input digital signal to derive the longest interval between the phase changes, storing the longest interval between phase changes, and providing a signal indicating the position of the longest interval between phase changes and an indication of the clock period of the input digital signal. A corresponding method for decoding a digital signal, includes counting the intervals between phase changes of the input digital signal to derive the longest interval between the phase changes, and providing a signal indicating the position of the longest interval between phase changes and an indication of the clock period of the input digital signal.

BRIEF DESCRIPTION OF THE FIGURES

An embodiment of the invention will now be described by way of example only and with reference to the figures in which.

DESCRIPTION OF A PREFERRED EMBODIMENT

The preferred embodiment is a semiconductor integrated circuit for acquisition of a SPDIF format digital audio signal. As already described, the invention is applicable to other formats of signal, but is particularly useful for bi-phase coded digital signals that may have any of a range of frequencies, as is the case for SPDIF format.

Figure 1:
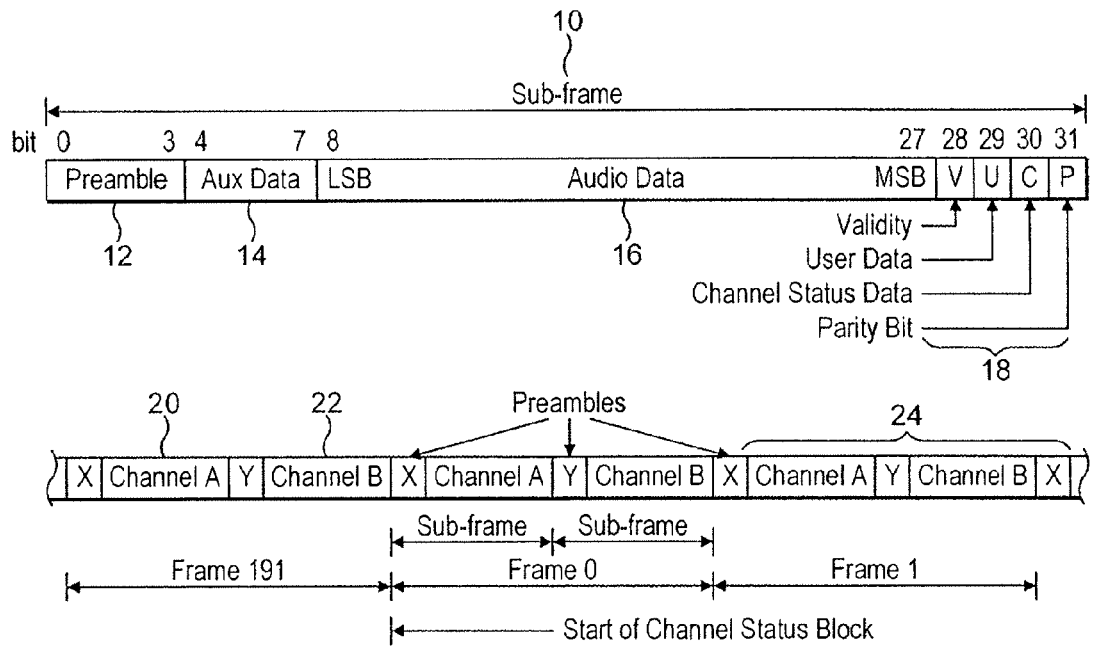
FIG. 1 shows the format of SPDIF frames.
Figure 2:
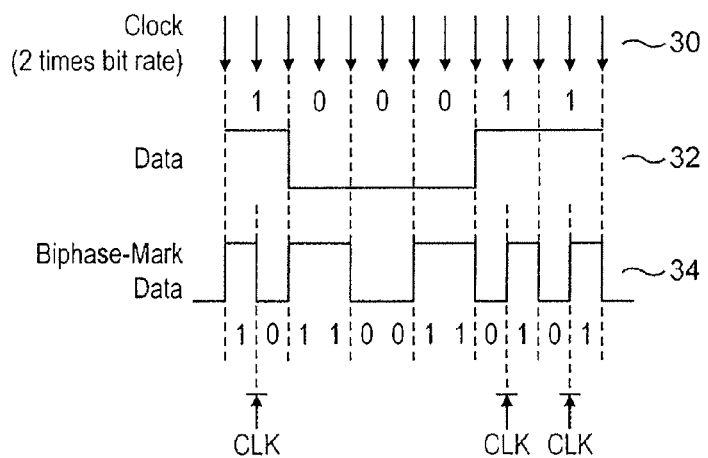
FIG. 2 shows the effect of bi-phase coding of a signal.

The SPDIF format of digital audio signals will first be described by way of background with reference to FIGS. 1 to 3. The frame and sub-frame format of the SPDIF signal is shown in FIG. 1 and comprises a preamble section 12, auxiliary data section 14 and audio data section 16, the whole assembled comprising a sub-frame 10 which also includes various parity and status bits 18. The sub-frames are assembled in a sequence of alternating types shown as Channel A 20 and Channel B 22. These provide left and right audio data respectively and are alternated with one another. A pair of sub-frames of Channel A and Channel B together comprises a frame of data 24. The frames themselves are assembled into a sequence of 192 frames, with a given preamble identified as preamble 12 repeated every 192 frames.

The preamble 12 of each sub-frame is a type of header which provides a marker for the start of each sub-frame. In SPDIF, there are two main types of preamble: type X associated with each Channel A sub-frame and type Y associated with each Channel B sub-frame.

Prior to describing the preamble X and preamble Y, the bi-phase coding of data will be described with reference to FIG. 2. Bi-phase coding involves modulating a data signal with a clock signal so that data and clock are coded together and transportable on a single bit bus. As shown in FIG. 2, a clock signal 30 (at two times the bit rate of the data signal) is coded onto a data signal 32. The coding is performed so that an edge (that is a change of signal state) within a bit indicates a "1" in the data signal, the absence of an edge within a bit indicates a "0" in the data signal. Thus, the first bit of data is "1" and so the bi-phase mark data has a transition change at the position marked as "CLK". The second, third and fourth bits in the data signal are "0" and so the bi-phase mark data continues in a sequence with no edges within each bit. The fifth and sixth bits are both "1" and so these have edges as shown by the positions "CLK". In this way the clock and data signals are coded together.

The Unit Interval (UI) in bi-phase coded data is the space between transitions. In the signal shown there are two UIs for each data bit (the clock rate being twice the data rate).

The system needs to recover an accurate clock signal from the bi-phase coded signal. After bi-phase coding there can be narrow and wide UIs and the system needs to identify edges of bits to find clock edges in the signal.

A known solution to recover the clock signal uses a Phase Locked Loop (PLL) to analyse the digital signal over many repeated cycles until a lock or the data signal itself is formed. A PLL typically takes of the order 20 ms to settle, and decoding cannot start until the clock has settled. The embodiment, however, uses a property of the preamble of the sub-frames to allow the signal to be acquired using a smaller integrated circuit and in a shorter time than the known PLL.

Figure 3:
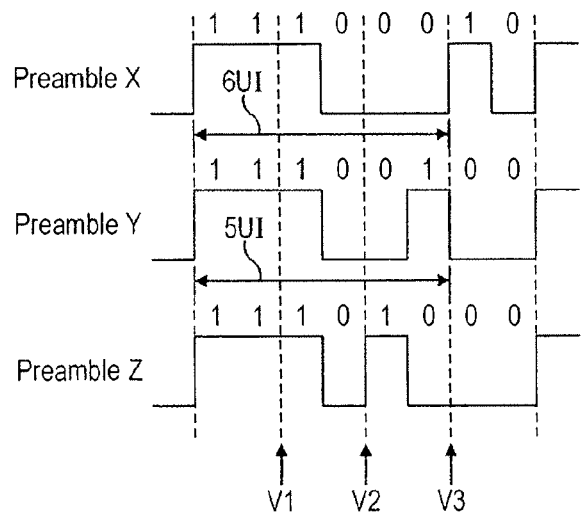
FIG. 3 shows the format of the preamble portion of an SPDIF signal.

The structure of the three different preamble signals X, Y and Z is shown in FIG. 3. These preamble signals use bi-phase coding violation as a mechanism to indicate the start of a sub-frame. Consider first the preamble X. In normal bi-phase coding, the bit sequence continues as 101010 etc, with a transition within each bit to indicate a "1" and the absence of a transition within each bit to indicate a "0". The preamble X starts with a high bit without any intra-bit transition. At the end of the first bit period, indicated as time VI, the signal does not drop to zero. The signal violates the bi-phase coding rule. Similarly, after two bit periods, at time V2, the signal does not change and so the bi-phase rule is violated.

The same situation occurs for preamble Y which violates the bi-phase coding at times V1 and V2. Preamble Z violates the rules at times V1 and V3. The bi-phase encoder inserts these violations to help the preamble stand out from the data. A consequence of the bi-phase violations is the length of the "pulse" within the preambles is longer than that within the data itself. The first pulse, that is the period from one rising clock edge to another in preamble X is 6 UI. The first pulse in preamble Y is 5 UI. The pulse is thus the time period between rising clock edges and is longer than any pulse in the data signal. Referring back to FIG. 2, it can be seen that the longest period between rising clock edges is 4 UI.

The embodiment comprises a "longest pulse" detector which detects the presence of this longer than normal period between rising clock edges which then instructs the circuit that the preamble has been located. At this point, the circuit can immediately begin decoding the signal.

Figure 4:
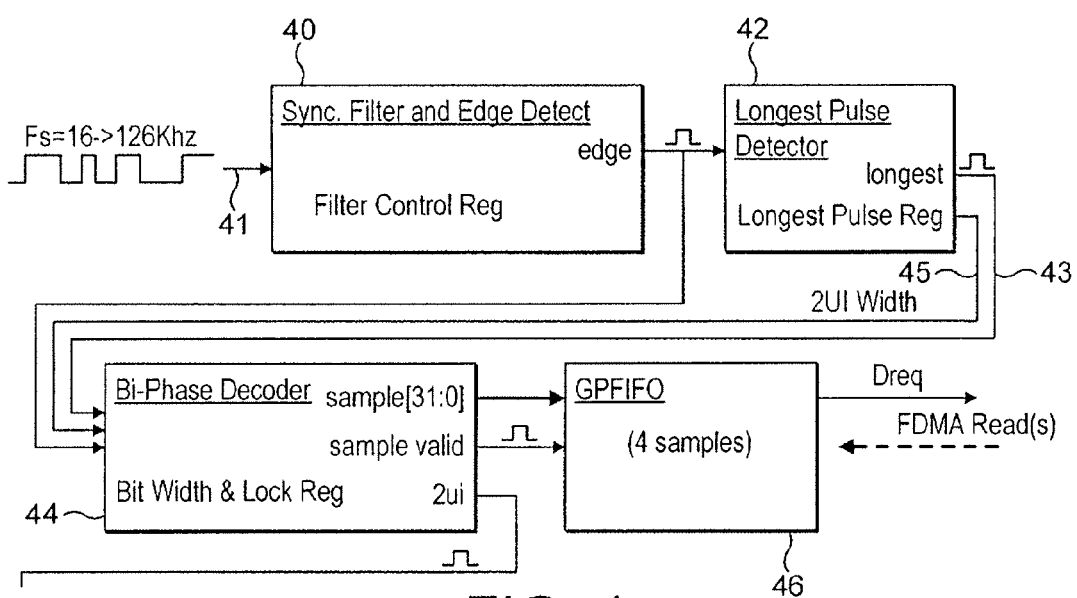
FIG. 4 shows an acquisition block of a semiconductor integrated circuit embodying the invention.

The acquisition block of a circuit embodying the invention is shown in FIG. 4. The block comprises a filter control register 40, a bit width and lock register 44 and GDFIFO 46 which can be implemented in known fashion. The additional feature in the block is the longest pulse register 42. The circuit operates as follows. An incoming signal 41, which may have frequency in a wide range, is first processed by the filter control register 40. This produces a pulse for each edge detection in the incoming signal. The pulses are then sent to the longest pulse detector. This asserts an output on a line, line 43, whenever a pulse in the received signal 41 is longer than a previous pulse. In addition, the longest pulse register 42 outputs a frequency indication signal on a line, line 45, indicating the 2 UI period of the incoming signal, thereby indicating the signal frequency. The bit width and lock register 44 implements a bi-phase decoder and this recovers the data signal from the clock signal for input to a GPFIFO 46 for subsequent processing.

Figure 5:
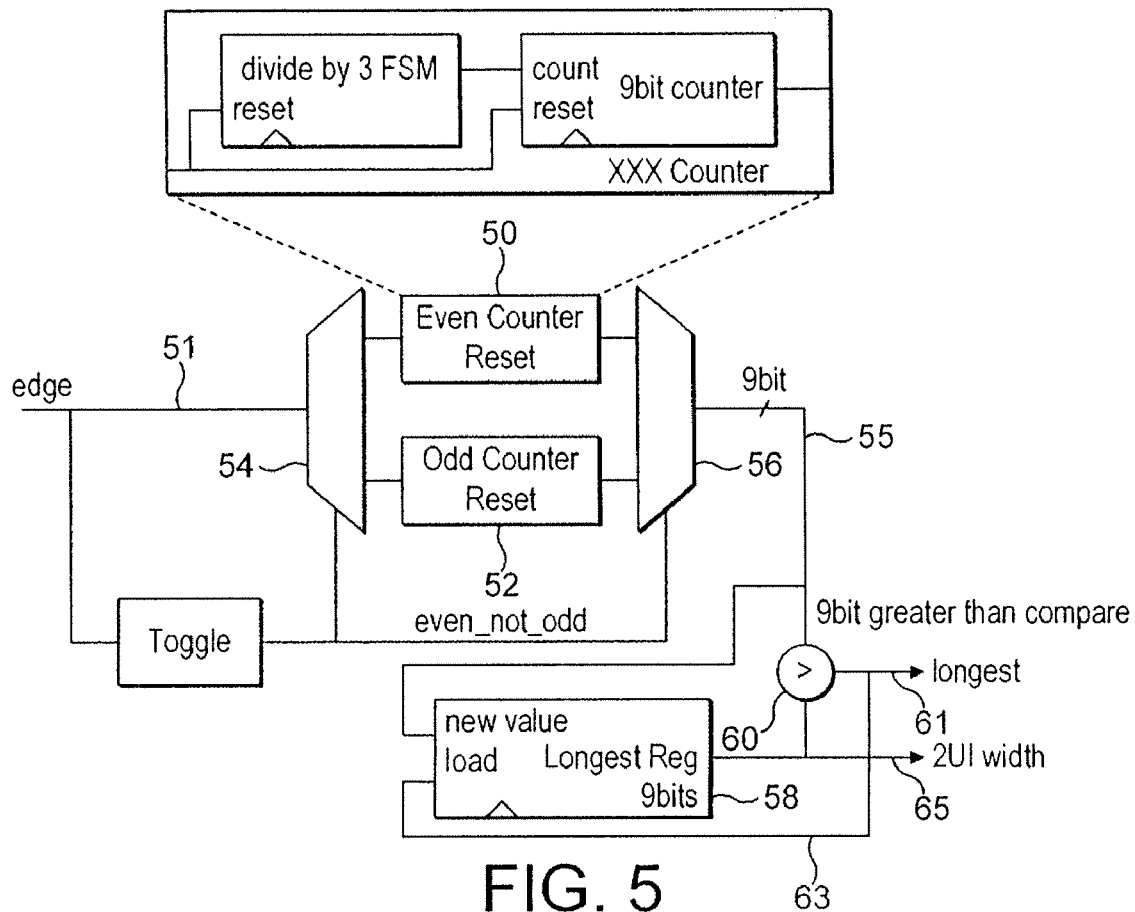
FIG. 5 shows a longest pulse detector of a semiconductor integrated circuit embodying the invention.

There are various possible implementations of the longest pulse detector, the preferred implementation being shown in FIG. 5. The longest pulse detector comprises two counters 50, 52 termed "even", counter 50 and "odd" counter 52. These are arranged to alternately start counting in multiples of the UI period as alternate clock edges of the input signal. The reason for having two such counters in this arrangement is to ensure that the longest gap is not missed. If one refers back to FIG. 3, it can be seen that starting a count on the first rising clock edge will count 6 UI as the pulse length, but starting on any other clock edge would give a shorter pulse length such that the long pulse, and hence the preamble, would not be detected. The input bi-phase signal could be inverted such that the longest pulse is between two falling clock edges, rather than between two rising clock edges. Using two counters ensures that the longest pulse in either situation will be found. The input edge signal on input line 51 is therefore provided to a first multiplexer 54 which is toggled every edge signal to provide the input edge signal alternately to a reset input of "even" counter 50 and "odd" counter 52. These counters count in any integer multiple of the UI period. In the present example the count period is every third cycle, effectively dividing by three, as shown by the divide by 3 FSM unit in FIG. 5. The advantage of this is to derive the clock signal without requiring subsequent division, as the 6 UI pulse divided by three gives 2 UI, which is the clock period. It is a neat arrangement to perform the division by simply counting in multiples of UI, rather than requiring further hardware to perform the division.

A second multiplexer 56 takes the output of each counter as a counter output line 55 and provides this to a longest value register 58. This register loads the new value at a new value input each time a longest pulse is detected. This is done by comparing the previous value for the longest pulse stored in the register with the current value using comparator 60. If the current value is longer than the previous value then an output is asserted on line 61 to the bi-phase decoder (FIG. 4). Simultaneously, the comparator output is taken on line 63 to the longest value register 58 and presented at a load input causing the current longest pulse value to be stored in the register. The longest pulse register also outputs the pulse width on line 65. Recalling that the preferred embodiment counts in a clock divided by 3, the longest pulse value output is the 2 UI width (the clock period) as required by later blocks. This is a matter of design choice and the counters could count in UI units and thus output the value 6 UI (as shown in the preamble X signal) which can be divided later. The implementation of counting in a multiple of UI, in this case 3 UI, allows a clock period to be directly recovered, rather than requiring further hardware for subsequent division. The 2 UI period is then supplied to an adaptive decoder which then derives an accurate clock signal. Adaptive decoders are well known and need not be describer here. The decoder simply needs to approximate frequency (because the input frequency could be any of a broad range of frequencies) and can then operate to recover a more accurate clock.

The period of time during which the pulse lengths need to be counted in the SPDIF signal can be seen by referring back to FIG. 1. The preamble X repeats every 4 sub-frames. Each sub-frame is 32 bits in length, and so the counter needs to count at least 4×32=128 bits to ensure that the longest pulse will have occurred in that time period. In other signals this period may differ. In general, a longest pulse detector needs to count for the duration of the repeat period of the characteristic longest pulse in the signal to be analysed.

Once the longest pulse has been recovered and the position and 2 UI period provided to the adaptive decoder, the longest pulse detector no longer operates and is removed from the signal path by a simple gate arrangement (not shown). This ensure that no further "longest pulses" are provided to the adaptive decoder as these could be glitches in the signal and, when operational, the adaptive decoder no longer requires further indications of the clock period.

Figure 6:
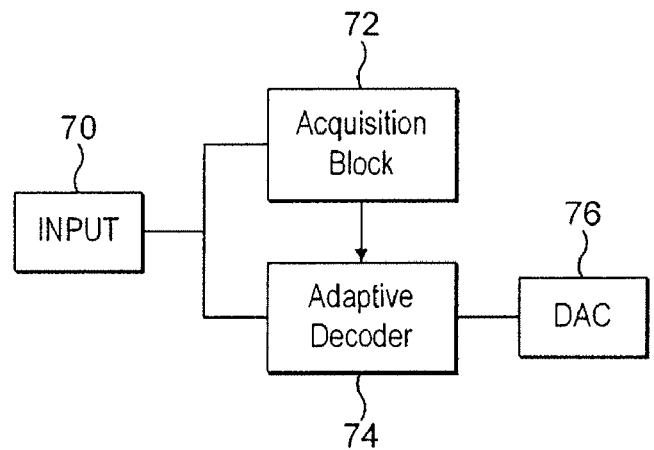
FIG. 6 shows an electronic device embodying the invention.

A device such as an audio amplifier or the like embodying the invention is shown in FIG. 6. An input 70 provides the bi-phase signal to the acquisition block 72 (as already described) which provides the position and clock period signal to an adaptive decoder 74 which then provides an accurate clock to the DAC 76. Other circuitry (not shown) for processing and amplifying the signal is also provided.

While there have been described above the principles of the present invention in conjunction with specific circuit designs and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

The invention claimed is:

1. A method for recovering a position and clock period from an input digital signal of the type having a marker period between phase changes that is longer than other periods between phase changes in the digital signal, the method comprising:

counting the intervals between phase changes of the input digital signal to derive the longest interval between the phase changes;
storing the longest interval between phase changes; and
providing a signal indicating the position of the longest interval between phase changes and an indication of the clock period of the input digital signal.

2. The method according to claim 1, further comprising detecting the longest interval between phase changes in a first direction and the longest interval between phase changes in a second direction.

3. The method according to claim 2, further comprising providing a first counter arranged to detect the longest interval between phase changes in the first direction and a second counter arranged to detect the longest interval between phase changes in the second direction.

4. The method according to claim 2, wherein the input digital signal comprises a bi-phase encoded signal of clock period 2 UI, the longest interval comprises 6 UI, and further comprising counting in multiples of three such that the clock period of 2 UI is directly recovered from the longest interval.

5. The method according to claim 2, wherein the digital signal comprises a bi-phase encoded signal and further comprising detecting a longest interval that violates bi-phase encoding rules in a header of the signal.

6. The method according to claim 1, further comprising counting in multiple unit intervals such that the indication of the clock period is effectively a division of the longest interval.

7. The method according to claim 6, further comprising detecting the longest interval between phase changes in a first direction and the longest interval between phase changes in a second direction.

8. The method according to claim 7, wherein the longest interval detector comprises a first counter arranged to detect the longest interval between phase changes in the first direction and a second counter arranged to detect the longest interval between phase changes in the second direction.

9. The method according to claim 8, wherein the input digital signal comprises a bi-phase encoded signal of clock period 2 UI, the longest interval is 6 UI, and further comprising counting in multiples of three such that the clock period of 2 UI is directly recovered from the longest interval.

10. The method according to claim 9, wherein the input digital signal comprises an SPDIF signal and further comprising detecting the longest period in the preamble.

11. The method according to claim 6, further comprising providing a first counter arranged to detect the longest interval between phase changes in the first direction and a second counter arranged to detect the longest interval between phase changes in the second direction.

12. The method according to claim 6, wherein the input digital signal comprises a bi-phase encoded signal of clock period 2 UI, the longest interval is 6 UI, and further comprising counting in multiples of three such that the clock period of 2 UI is directly recovered from the longest interval.

13. The method according to claim 6, wherein the digital signal comprises a bi-phase encoded signal and further comprising detecting a longest interval that violates bi-phase encoding rules in a header of the signal.

14. The method according to claim 1, wherein the input digital signal comprises a bi-phase encoded signal of clock period 2 UI, the longest interval comprises 6 UI, and further comprising counting in multiples of three such that the clock period of 2 UI is directly recovered from the longest interval.

15. The method according to claim 1, wherein the digital signal comprises a bi-phase encoded signal and further comprising detecting a longest interval that violates bi-phase encoding rules in a header of the signal.

16. The method according to claim 15, wherein the input digital signal comprises an SPDIF signal and further comprising detecting the longest period in the preamble.

17. The method according to claim 1, wherein the input digital signal comprises an SPDIF signal and further comprising detecting the longest period in the preamble.

18. A method for decoding a digital signal, comprising:
 counting the intervals between phase changes of the input digital signal to derive the longest interval between the phase changes; and
 providing a signal indicating the position of the longest interval between phase changes and an indication of the clock period of the input digital signal.

19. The method of claim 18 further comprising storing the longest interval between phase changes.

20. The method of claim 18 wherein the digital signal is provided by an audio amplifier, a DVD player, or a DVD recorder.

* * * * *